(12) United States Patent
Dropps et al.

(10) Patent No.: US 7,792,115 B2
(45) Date of Patent: Sep. 7, 2010

(54) METHOD AND SYSTEM FOR ROUTING AND FILTERING NETWORK DATA PACKETS IN FIBRE CHANNEL SYSTEMS

(75) Inventors: Frank R. Dropps, Maple Grove, MN (US); Edward C. Ross, Edina, MN (US); Steven M. Betker, Shoreview, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1577 days.

(21) Appl. No.: 10/894,546

(22) Filed: Jul. 20, 2004

(65) Prior Publication Data

US 2005/0044267 A1   Feb. 24, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
   H04L 12/56 (2006.01)
(52) U.S. Cl. .................... 370/392
(58) Field of Classification Search ............ None
   See application file for complete search history.

(56) References Cited

U.S. PATENT DOCUMENTS 4,081,612 A    3/1978  Hafner (Continued)

FOREIGN PATENT DOCUMENTS

EP    0649098    9/1994

(Continued)

OTHER PUBLICATIONS

Banks, David C., et al., "Link Trunking and Measuring Link Latency in Fibre Channel Fabric", U.S. Appl. No. 60/286,046, 1-52.

(Continued)

Primary Examiner—Pankaj Kumar
Assistant Examiner—Marcus R Smith
(74) Attorney, Agent, or Firm—Klein, O'Neill & Singh, LLP

(57) ABSTRACT

A fiber channel switch element with an alias cache is provided for routing and filtering frames. The alias cache includes plural entries including a control word having plural fields including an action code for routing frames; an alias word that is compared to incoming frame data using a frame byte compare block; and a bit mask generator for filtering bit combinations from the frame byte compare block; and a depth match block for determining equality between a control word depth field and incoming frame depth field. Frame data comparison is performed on a bit by bit or byte-by-byte basis. An alias cache entry also includes prerequisite data to determine if results of a different entry are to be used to determine an entry match. The action code routes a frame to a processor, discards a frame, sets a status for inspecting a frame or routes a frame based on a standard Fiber Channel addressing scheme.

18 Claims, 14 Drawing Sheets

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,638,518 A | 6/1997 | Malladi | |
| 5,666,483 A | 9/1997 | McClary | |
| 5,677,909 A | 10/1997 | Heide | |
| 5,687,172 A | 11/1997 | Cloonan et al. | 370/395 |
| 5,687,387 A | 11/1997 | Endejan et al. | |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,751,710 A | 5/1998 | Crowther et al. | |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,148,421 A | 11/2000 | Hoese et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,339,813 B1 | 1/2002 | Smith et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry et al. | 710/261 |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |

| Patent No. | Date | Inventor |
|---|---|---|
| 6,606,690 B2 | 8/2003 | Padovano |
| 6,614,796 B1 | 9/2003 | Black et al. |
| 6,622,206 B1 | 9/2003 | Kanamaru et al. |
| 6,625,157 B2 | 9/2003 | Niu et al. |
| 6,629,161 B2 | 9/2003 | Matsuki et al. |
| 6,643,298 B1 | 11/2003 | Brunheroto et al. |
| 6,657,962 B1 | 12/2003 | Barri et al. |
| 6,684,209 B1 | 1/2004 | Ito et al. |
| 6,697,359 B1 | 2/2004 | George ................... 370/357 |
| 6,697,368 B2 | 2/2004 | Chang et al. |
| 6,697,914 B1 | 2/2004 | Hospodor et al. |
| 6,700,877 B1 | 3/2004 | Lorenz et al. |
| 6,718,497 B1 | 4/2004 | Whitby-Strevens |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,765,871 B1 | 7/2004 | Knobel et al. |
| 6,779,083 B2 | 8/2004 | Ito et al. |
| 6,785,241 B1 | 8/2004 | Lu et al. |
| 6,807,181 B1 | 10/2004 | Weschler |
| 6,816,492 B1 | 11/2004 | Turner et al. |
| 6,816,750 B1 | 11/2004 | Klaas |
| 6,859,435 B1 | 2/2005 | Lee et al. |
| 6,865,155 B1 | 3/2005 | Wong et al. |
| 6,865,157 B1 | 3/2005 | Scott et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 | 12/2005 | Parry et al. |
| 6,983,342 B2 | 1/2006 | Helenic et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,082,126 B2 * | 7/2006 | Ain et al. .................... 370/366 |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,570 B2 | 6/2007 | Gregg |
| 7,233,985 B2 | 6/2007 | Hahn et al. |
| 7,239,641 B1 | 7/2007 | Banks et al. |
| 7,245,613 B1 | 7/2007 | Winkles et al. |
| 7,245,627 B2 | 7/2007 | Goldenberg et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,131 B2 | 9/2007 | Cashman et al. |
| 7,269,168 B2 | 9/2007 | Roy et al. |
| 7,275,103 B1 | 9/2007 | Thrasher et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,310,389 B2 | 12/2007 | Waschura et al. |
| 7,315,511 B2 | 1/2008 | Morita et al. |
| 7,319,669 B1 | 1/2008 | Kunz et al. |
| 7,327,680 B1 | 2/2008 | Kloth |
| 7,334,046 B1 | 2/2008 | Betker, Steven M. |
| 7,346,707 B1 | 3/2008 | Erimli |
| 7,352,701 B1 | 4/2008 | Kunz |
| 7,352,740 B2 | 4/2008 | Hammons et al. |
| 7,362,702 B2 | 4/2008 | Terrell et al. |
| 7,397,788 B2 | 7/2008 | Mies et al. |
| 7,406,034 B1 | 7/2008 | Cometto et al. |
| 7,406,092 B2 | 7/2008 | Dropps et al. |
| 7,424,533 B1 | 9/2008 | Di Benedetto et al. |
| 7,443,794 B2 | 10/2008 | George et al. |
| 7,460,534 B1 | 12/2008 | Ballenger |
| 7,466,700 B2 | 12/2008 | Dropps et al. |
| 7,471,691 B2 | 12/2008 | Black et al. |
| 7,492,780 B1 | 2/2009 | Goolsby |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. .................. 370/392 |
| 2001/0043564 A1 | 11/2001 | Bloch et al. |
| 2002/0016838 A1 | 2/2002 | Geluc et al. |
| 2002/0034178 A1 | 3/2002 | Schmidt et al. |
| 2002/0067726 A1 * | 6/2002 | Ganesh et al. ............... 370/392 |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124102 A1 | 9/2002 | Kramer et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0037159 A1 | 2/2003 | Zhao et al. |
| 2003/0046396 A1 | 3/2003 | Richter et al. |
| 2003/0063567 A1 | 4/2003 | Dehart |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |

| | | |
|---|---|---|
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0112819 A1 | 6/2003 | Kofoed et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0152076 A1 | 8/2003 | Lee et al. |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0191883 A1 | 10/2003 | April |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Forbes |
| 2004/0024831 A1 | 2/2004 | Yang et al. |
| 2004/0027989 A1 | 2/2004 | Martin et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ...................... 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153863 A1 | 8/2004 | Klotz et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey et al. |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Office Action from USPTO dated Sep. 23, 2008 for U.S. Appl. No. 12/031,585".

"Notice of Allowance from the USPTO dated Sep. 29, 2008 for U.S. Appl. No. 10/889,267".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Notice of Allowance from USPTO dated Oct. 8, 2008 for U.S. Appl. No. 10/889,255".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Nov. 13, 2008 for U.S. Appl. No. 10/894,587".

"Office Action from USPTO dated Nov. 13, 2008 for U.S. Appl. No. 10/894,917".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17. 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Office Action from USPTO dated Sep. 18, 2008 for U.S. Appl. No. 10/894,978".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Brown, Douglas W., "A State-Machine Synthesizer", *18th Design Automation Conference*, (1981),301-305.
"Examination Report from the European Patent Office dated Oct. 12, 2007 for European Application No. 05 805 632.6".
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support" ; VF Switch Support, T11/04-395v2. Sep. 2004, pp. 1-15.
Pelissier et al, "Inter-Fabric Routing" , dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture" , Presentation by Brocade to T11/03-369V0 dated Jun. 2, 2003.
U.S. Appl. No. 10/266,360, filed Oct. 7, 2002, Method And System For Reducing Congestion In Computer Networks.
U.S. Appl. No. 10/241,153, filed Sep. 11, 2002, Zone Management In A Multi-Module Fibre Channel Switch.
U.S. Appl. No. 10/263,858, filed Oct. 3, 2002, Method And System For Using Distributed Name Servers In Multi-Module Fibre Channel Switching.
U.S. Appl. No. 10/212,425, filed Aug. 5, 2002, Method And System For Flexible Routing In A Fibre Channel System.
U.S. Appl. No. 10/302,149, filed Nov. 22, 2002, Method And System For Controlling Packet Flow In Networks.
U.S. Appl. No. 10/894,579, filed Jul. 20, 2004, Method and System for Managing Traffic in Fibre Channel Switches.
U.S. Appl. No. 10/894,827, filed Jul. 20, 2004, Method and System for Selecting Virtual Lanes in Fibre Channel Switches.

U.S. Appl. No. 10/894,597, filed Jul. 20, 2004, Programmable Pseudo Virtual Lanes for Fibre Channel Systems.
U.S. Appl. No. 10/894,595, filed Jul. 20, 2004, Method and System for Reducing Latency and Congestion in Fibre Channel Switches.
U.S. Appl. No. 10/664,548, filed Sep. 19, 2003, Buffer to Buffer Credit Recovery for In-Line Fibre Channel Credit Extension Devices.
U.S. Appl. No. 10/895,175, filed Jul. 20, 2004, Method and System for Detecting Congestion and Over Subscription in a Fibre Channel Network.
U.S. Appl. No. 10/894,492, filed Jul. 20, 2004, LUN Based Hard Zoning in Fibre Channel Switches.
U.S. Appl. No. 10/894,587, filed Jul. 20, 2004, Multi Speed Cut Through Operation in Fibre Channel Switches.
U.S. Appl. No. 10/894,726, filed Jul. 20, 2004, Method and System for Improving Bandwidth & Reducing Idles in Fibre Channel Switches.
U.S. Appl. No. 10/894,629, filed Jul. 20, 2004, Method and System for Routing Fibre Channel Systems.
U.S. Appl. No. 10/894,491, filed Jul. 20, 2004, Method and System for Keeping a Fibre Channel Arbitrated Loop Open During Frame Gaps.
U.S. Appl. No. 10/894,536, filed Jul. 20, 2004, Method And System For Congestion Control Based On Optimum Bandwidth Allocation In A Fibre Channel Switch.
U.S. Appl. No. 10/894,627, filed Jul. 20, 2004, Method and System for Programmable Data Dependent Network Routing.
U.S. Appl. No. 10/719,077, filed Nov. 21, 2003, Method and System for Monitoring Events in Storage Area Networks.
U.S. Appl. No. 10/894,689, filed Jul. 20, 2004, Method and System for Power Control of Fibre Channel Switches.
U.S. Appl. No. 10/798,527, filed Mar. 11, 2004, Method and System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method And System For Inexpensive And Non-Disruptive Data Capture In Networks.
U.S. Appl. No. 10/889,337, filed Jul. 12, 2004, Method And System For Minimizing Disruption In Common-Access Networks.
U.S. Appl. No. 10/889,259, filed Jul. 12, 2004, Method And Apparatus For Detecting And Removing Orphaned Primitives In A Fibre Channel Network.
U.S. Appl. No. 10/889,267, filed Jul. 12, 2004, Method And System For Fibre Channel Arbitrated Loop Acceleration.
U.S. Appl. No. 10/889,551, filed Jul. 12, 2004, Method And Apparatus For Testing Loop Pathway Integrity In A Fibre Channel Arbitrated Loop.
U.S. Appl. No. 10/889,256, filed Jul. 12, 2004, Method And Apparatus For Accelerating Receive-Modify-Send Frames In A Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method And Apparatus For Improving Buffer Utilization In Communication Networks.
U.S. Appl. No. 10/894,597, filed Jul. 20, 2004, Method And System For Using Extended Fabric Features With Fibre Channel Switch Elements.
U.S. Appl. No. 10/894,978, filed Jul. 20, 2004, Method And System for Programmable Data Dependent.
U.S. Appl. No. 10/894,917, filed Jul. 20, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method And System For Congestion Control In A Fibre Channel Switch.
U.S. Appl. No. 10/957,465, filed Oct. 1, 2004, Method and System for Using Boot Servers in Fibre Channel Network Routing.

U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch For Mixed Switch Fabrics.
U.S. Appl. No. 10/956,718, filed Oct. 1, 2004, Method and System for Using an In-Line Credit Extender with a Host Bus Adapter.
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".

"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Appl. No. 05798761.2".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
Curtis, A. R., "Design Considerations for 10-Gbit Fibre Channel", Curtis A. Ridgeway, *Distinguished I/O Architect, Storage and Computing ASIC's Division, LSI Logic Corp.*, (Apr. 2003).
Malavalli, Kumar, "High Speed Fibre Channel Switching Fabric Devices", *Proceedings of the SPIE, SPIE*, Bellingham, VA, USA vol. 1577., XP000562869, ISSN: 0277-786X, (Sep. 4, 1991),216-226.
Melhem, et al., "Minimizing Wavelength Conversions In WDM Path Establishment", *Computer Science Department, University of Pittsburgh*, Pittsburgh, PA 15260, (2001),197-211.
Ridgeway, Curt, "0GFC-40GFC using 4-lane XAUI's", *LSI Logic Presentation—T11/03-069v0*, (Feb. 2003).
"Office Action from USPTO dated Jun. 10, 2010 for U.S. Appl. No. 12/259,197".
"Final Office Action from USPTO dated Mar. 4, 2010 for U.S. Appl. No. 10/957,465".
"Office Action from USPTO dated Mar. 29, 2010 for U.S. Appl. No. 12/189,502".
"Office Action from Chinese State Intellectual Property Office dated Jul. 10, 2009 for Chinese Application No. 200580032888.6".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Office Action from USPTO dated Jan. 6, 2010 for U.S. Appl. No. 10/956,501".
"Office Action from State Intellectual Property Office dated Dec. 4, 2009 for Chinese Application No. 200580032947.X".
"Notice of Allowance from USPTO dated Jan. 21, 2010 for U.S. Appl. No. 10/894,547".
"Office Action from USTPO dated Jan. 26, 2010 for U.S. Appl. No. 10/956,501".
"Final Office Action from USPTO dated Feb. 12, 2010 for U.S. Appl. No. 10/894,732".

* cited by examiner

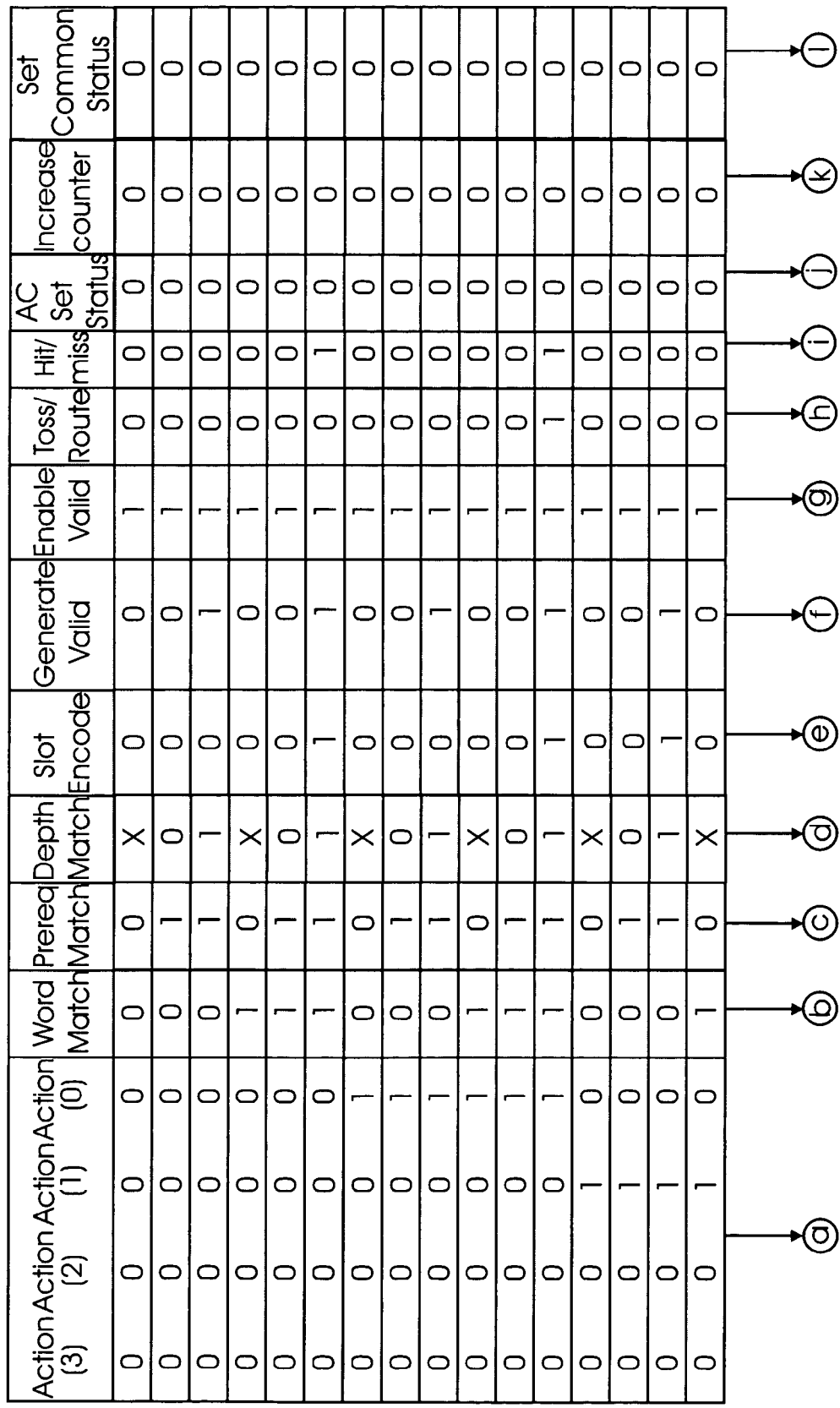
FIGURE 5-i

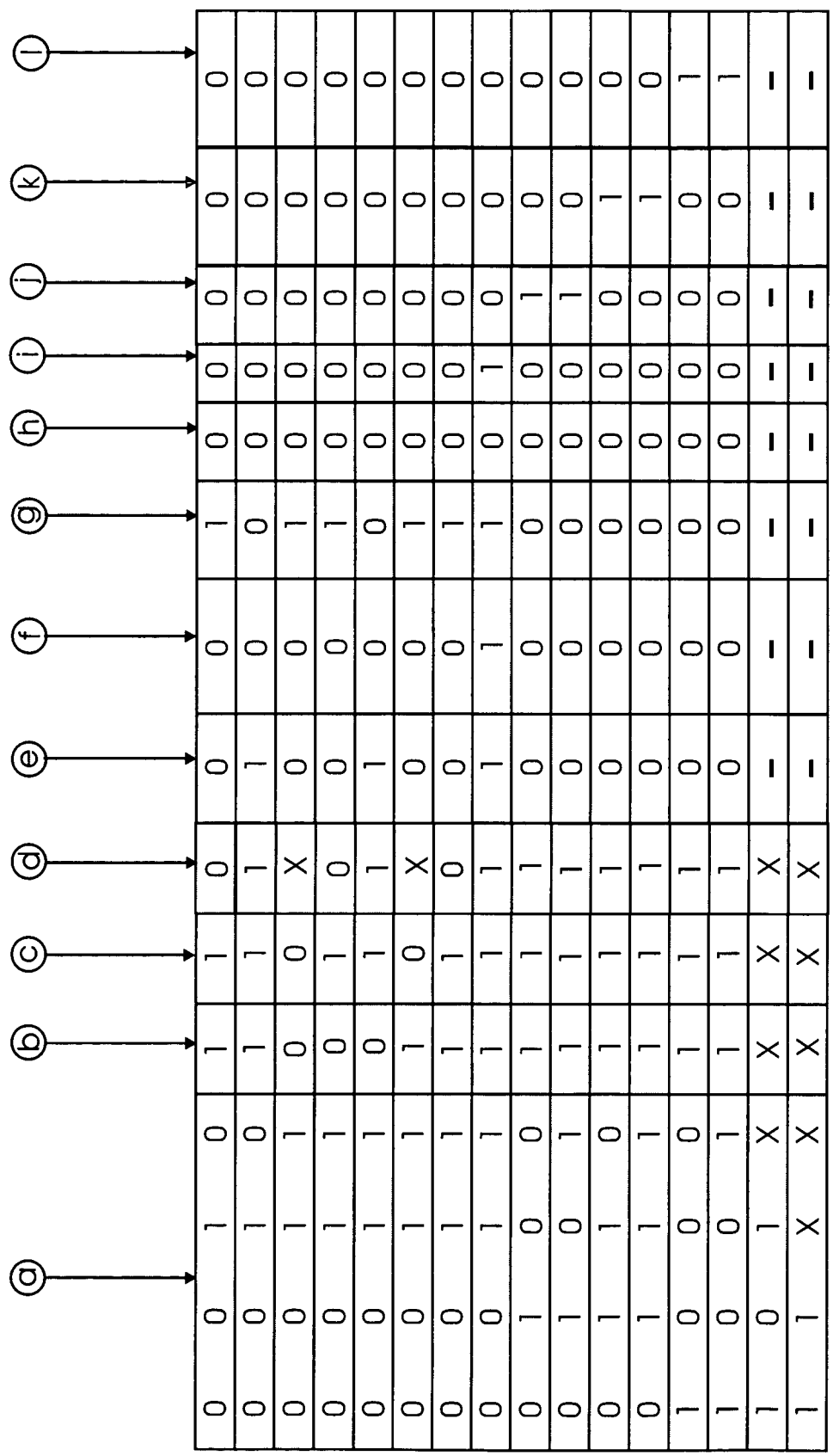
FIGURE 5-ii

METHOD AND SYSTEM FOR ROUTING AND FILTERING NETWORK DATA PACKETS IN FIBRE CHANNEL SYSTEMS

CROSS REFERENCE TO RELATED APPLICATIONS

This application claims priority under 35 U.S.C. §119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for managing Traffic in Fibre Channel Switches".

The disclosure of the foregoing applications is incorporated herein by reference in their entirety.

BACKGROUND

1. Field of the Invention

The present invention relates to fibre channel systems, and more particularly to routing and filtering network data packets.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Conventional fibre channel switches use a frame's D_ID to route frames. This option alone may not be enough for efficiently routing and filtering frames in complex fibre channel systems.

Therefore, there is a need for a process and system that allows efficient frame routing and filtering.

SUMMARY OF THE PRESENT INVENTION

In one aspect of the present invention, a method for routing and filtering frames in a fibre channel switch is provided. The method includes comparing incoming frame data to plural alias cache entries at the same time; performing a word depth match by comparing incoming frame word depth with a programmed word depth; and routing frames based on a programmed action code that is a part of an alias cache entry.

Frame data comparison is performed on a bit by bit or byte-by-byte basis. Also, an action code routes a frame to a specified destination, discards a frame, sets a status for inspecting a frame or routes a frame based on a standard Fibre Channel addressing scheme. An alias cache entry includes prerequisite data to determine if a different entry's compare results at a different frame word depth are to be used to determine an entry match.

In yet another aspect of the present invention, a system for routing and filtering frames in a fibre channel switch is provided. The system includes, an alias cache with an alias cache entry, where the alias cache entry includes, a control word having plural fields including an action code for routing frames; an alias word that is compared to incoming frame data using a frame byte compare block; and a bit mask generator for filtering bit combinations from the frame byte compare block; and a depth match block for determining equality between a control word depth field and incoming frame depth field.

In yet another aspect, a fibre channel switch element for routing and filtering frames in a fibre channel network is provided. The fibre channel switch element includes, an alias cache with an alias cache entry, where the alias cache entry includes, a control word having plural fields including an action code for routing frames; an alias word that is compared to incoming frame data using a frame byte compare block; and a bit mask generator for filtering bit combinations from the frame byte compare block; and a depth match block for determining equality between a control word depth field and incoming frame depth field.

In yet another aspect of the present invention, a method for routing and filtering frames using a fibre channel switch element having an alias cache is provided. The method includes, determining if an incoming frame is pre-destined for a switch processor; comparing incoming frame data to plural alias cache entries at the same time if the incoming frame is not pre-destined to the switch processor; performing a word depth match by comparing incoming frame word depth with a programmed word depth; and routing frames based on a programmed action code that is a part of an alias cache entry.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 2-1/2-2 (jointly referred to as FIG. 2) show a schematic of an alias cache used to route frames, according to one aspect of the present invention;

FIGS. 5-i/5-ii (jointly referred to as FIG. 5) show an example of a table with various alias cache entries, used according to one aspect of the present invention.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"D_ID": 24-bit fibre channel frame header field that contains destination address.

"Domain_Id": The high 8 bits of a 24-bit fibre channel address that identifies a switch within a fabric.

"EOF": End of Frame

"E-Port": A fabric expansion port that attaches to another interconnect port to create an Inter-Switch Link.

"F_Port": A port to which non-loop N_Ports are attached to a fabric and does not include FL_ports.

"Fibre channel ANSI Standard": This standard, incorporated herein by reference in its entirety, describes the physical interface, transmission and signaling protocol of a high performance serial link for support of other high level protocols associated with IPI, SCSI, IP, ATM and others.

"FC-1": This is a Fibre Channel transmission protocol, which includes serial encoding, decoding and error control.

"FC-2": This is a Fibre Channel signaling protocol that includes frame structure and byte sequences.

"FC-3": This Fibre Channel protocol defines a set of fibre channel services that are common across plural ports of a node.

"FC-4": This Fibre Channel Protocol provides mapping between lower levels of fibre channel, IPI and SCSI command sets, HIPPI data framing, IP and other upper level protocols.

"Fabric": A system which interconnects various ports attached to it and is capable of routing fibre channel frames by using destination identifiers provided in FC-2 frame headers.

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F.Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"R_CTL": A 8-bit fibre channel frame header field that identifies the type of frame.

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
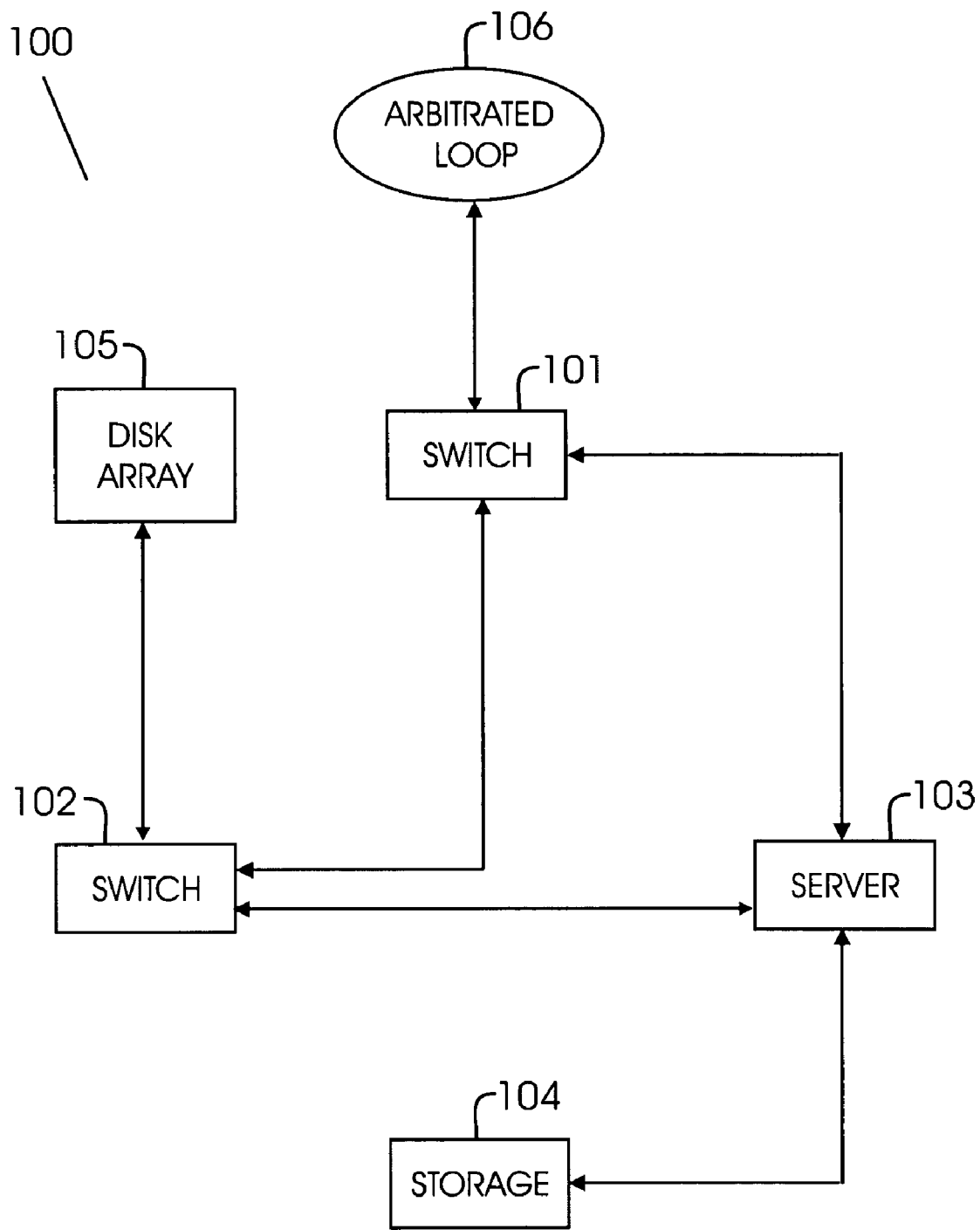
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
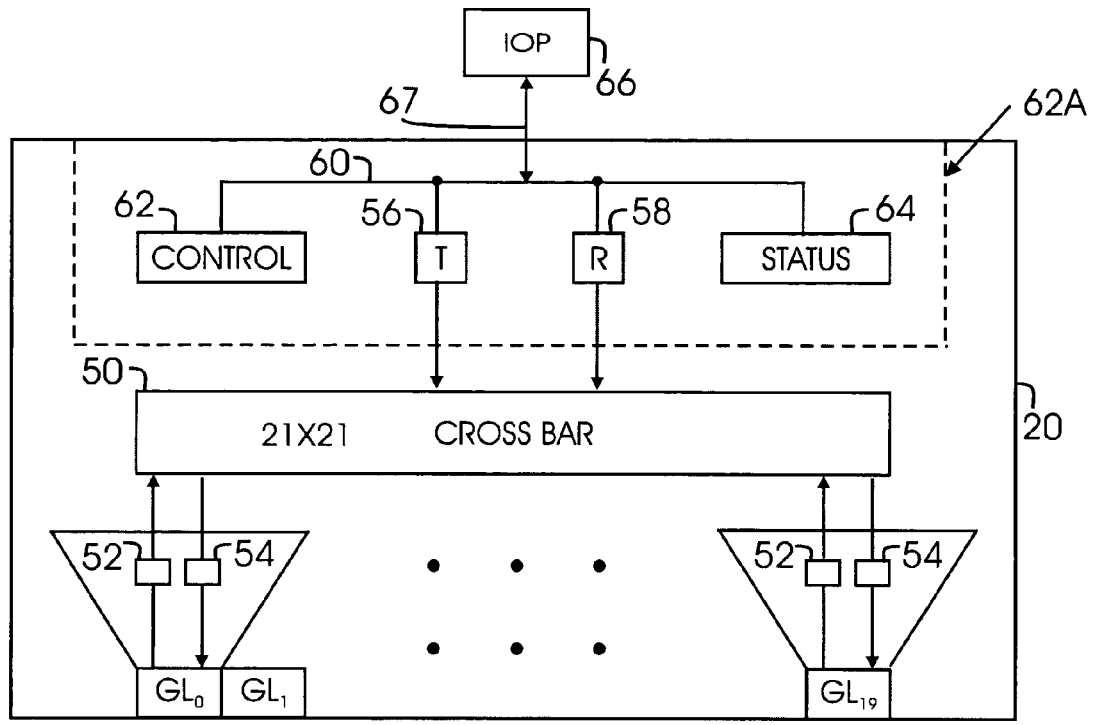
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
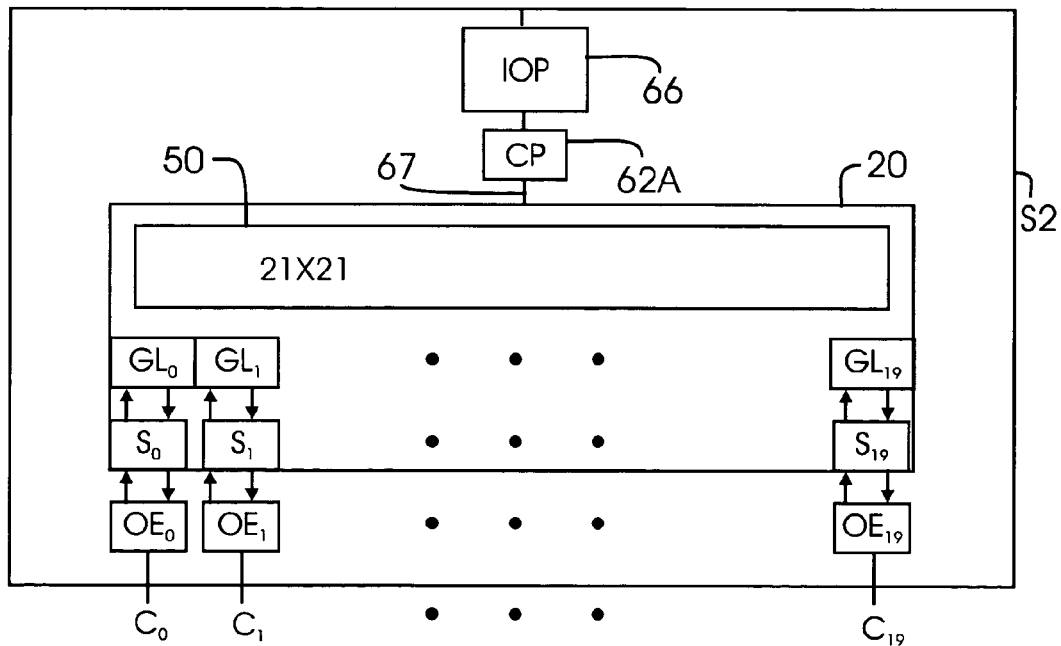
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
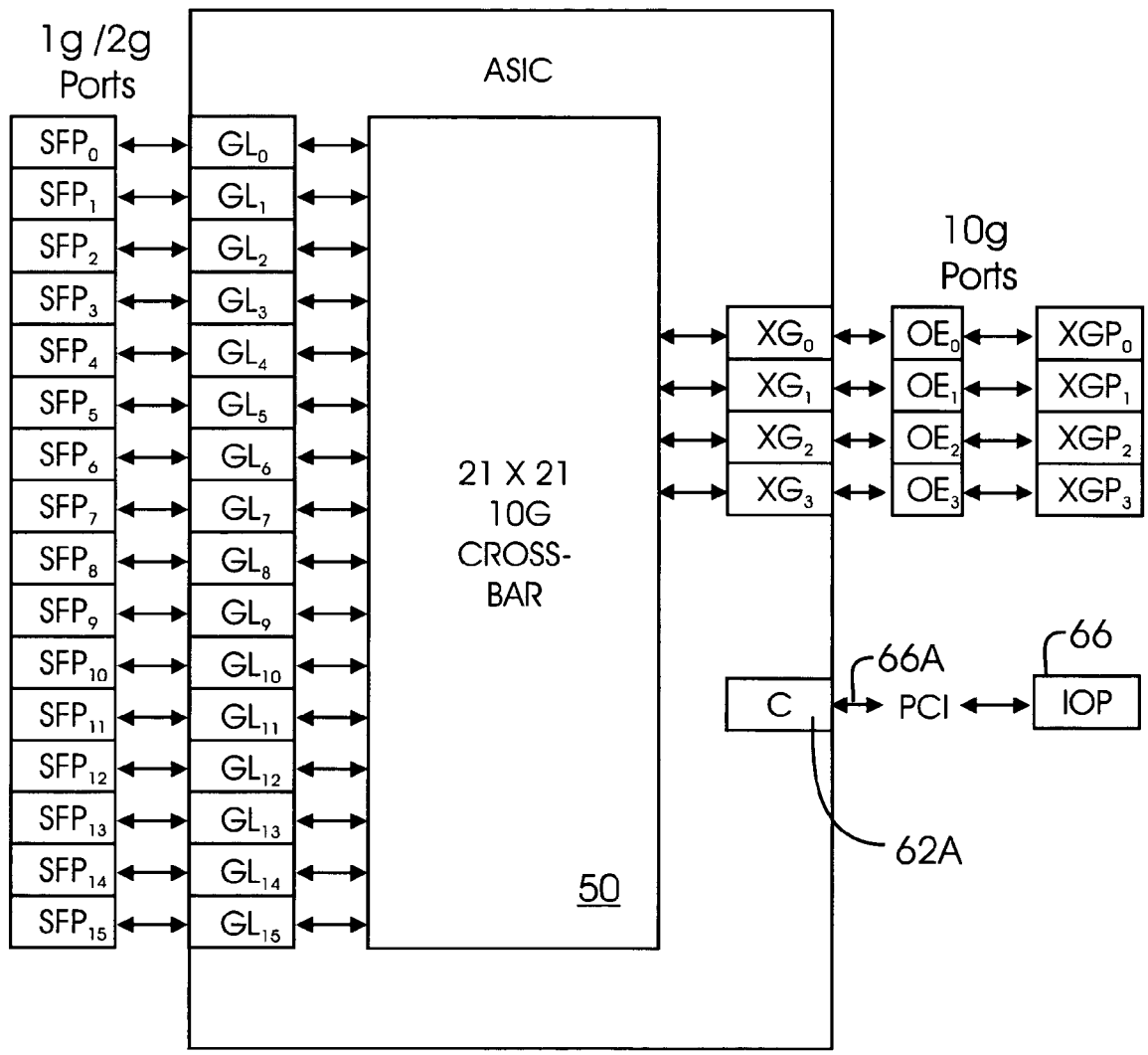
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 includes a control port 62A that is coupled to IOP 66 through a PCI connection 66A.

Figures 1, 1E:
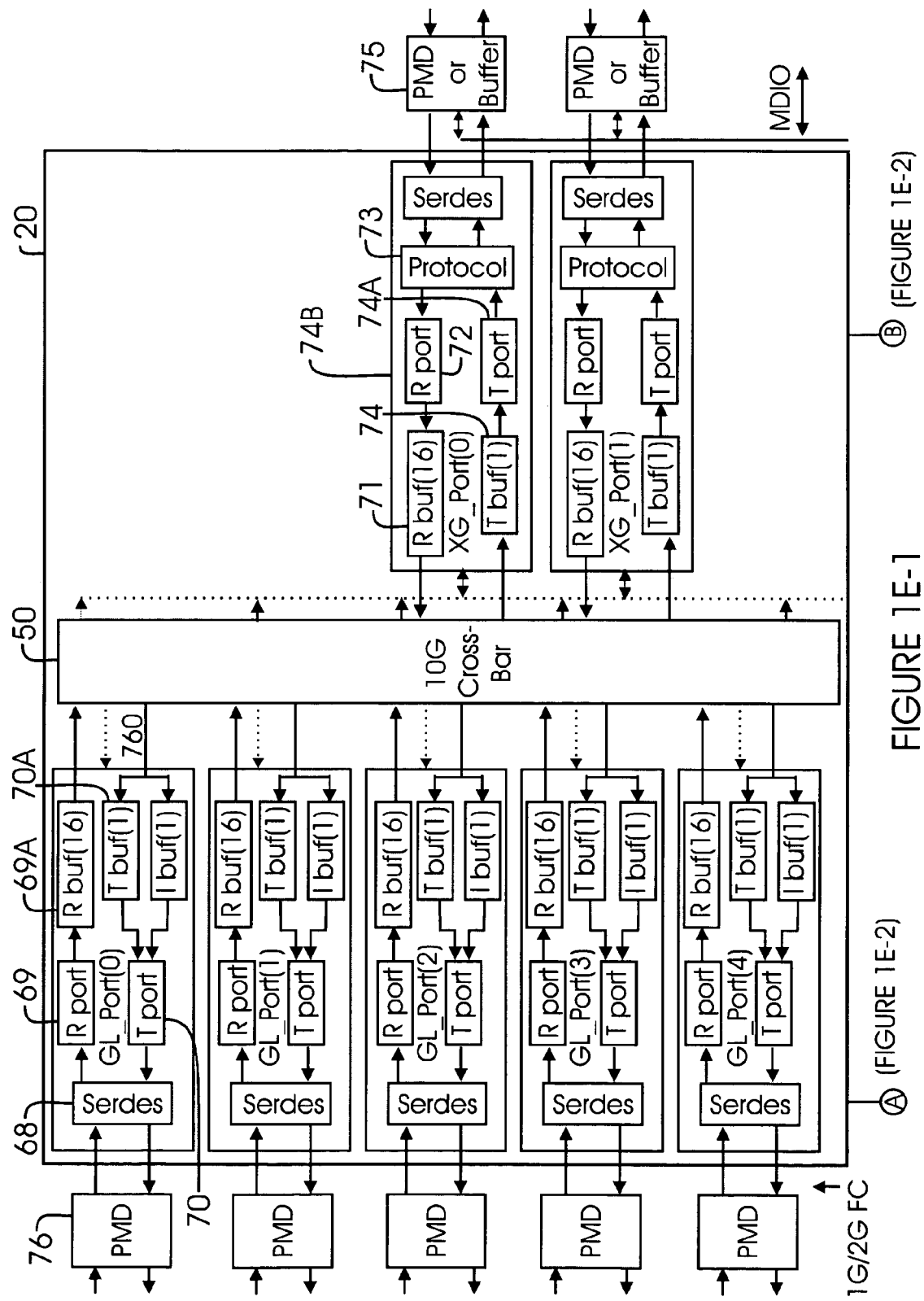
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
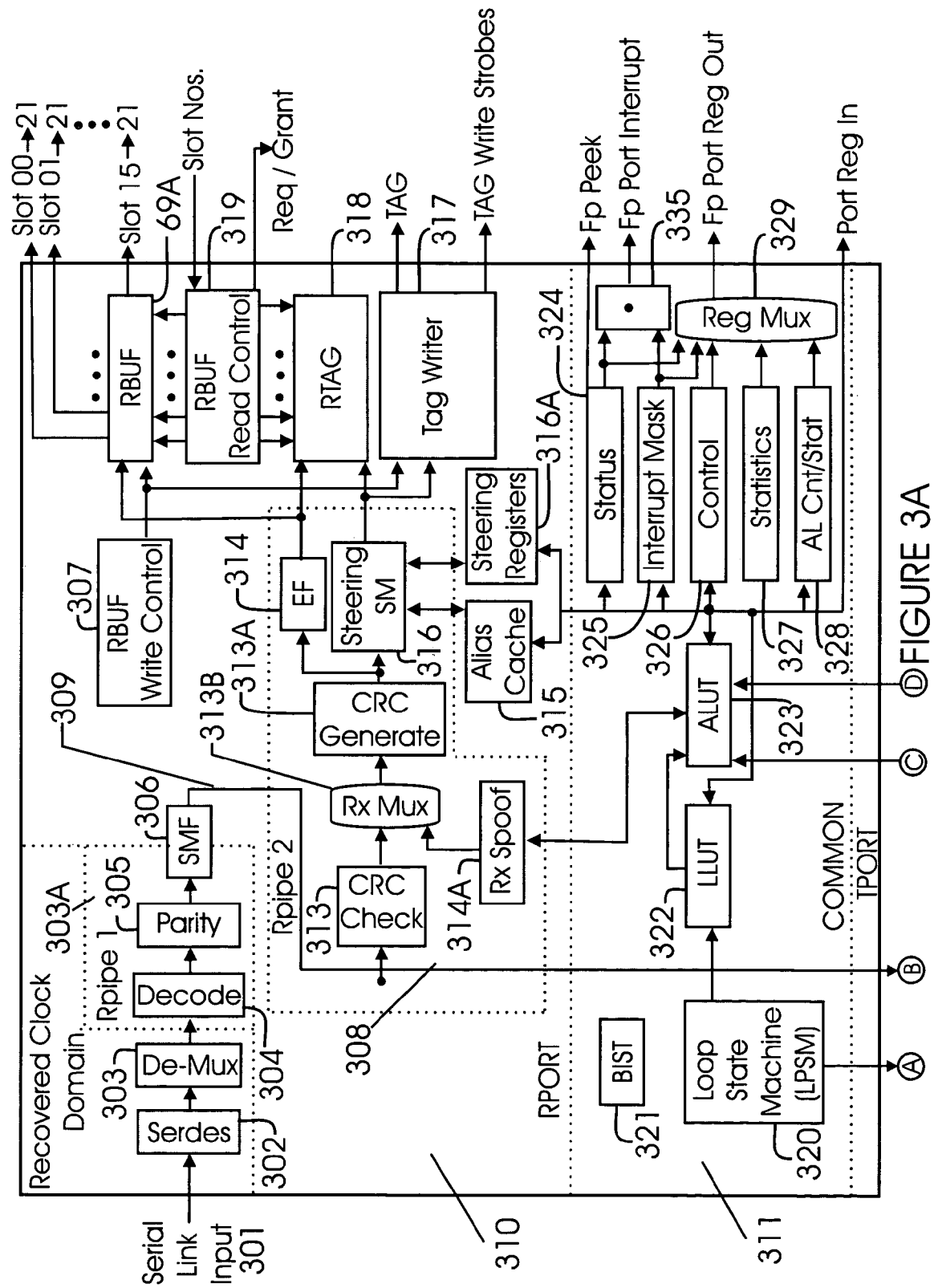
FIGS. 3A/3B (jointly referred to as FIG. 3) show a block diagram of a GL_Port, according to one aspect of the present invention.
Figure 3B:
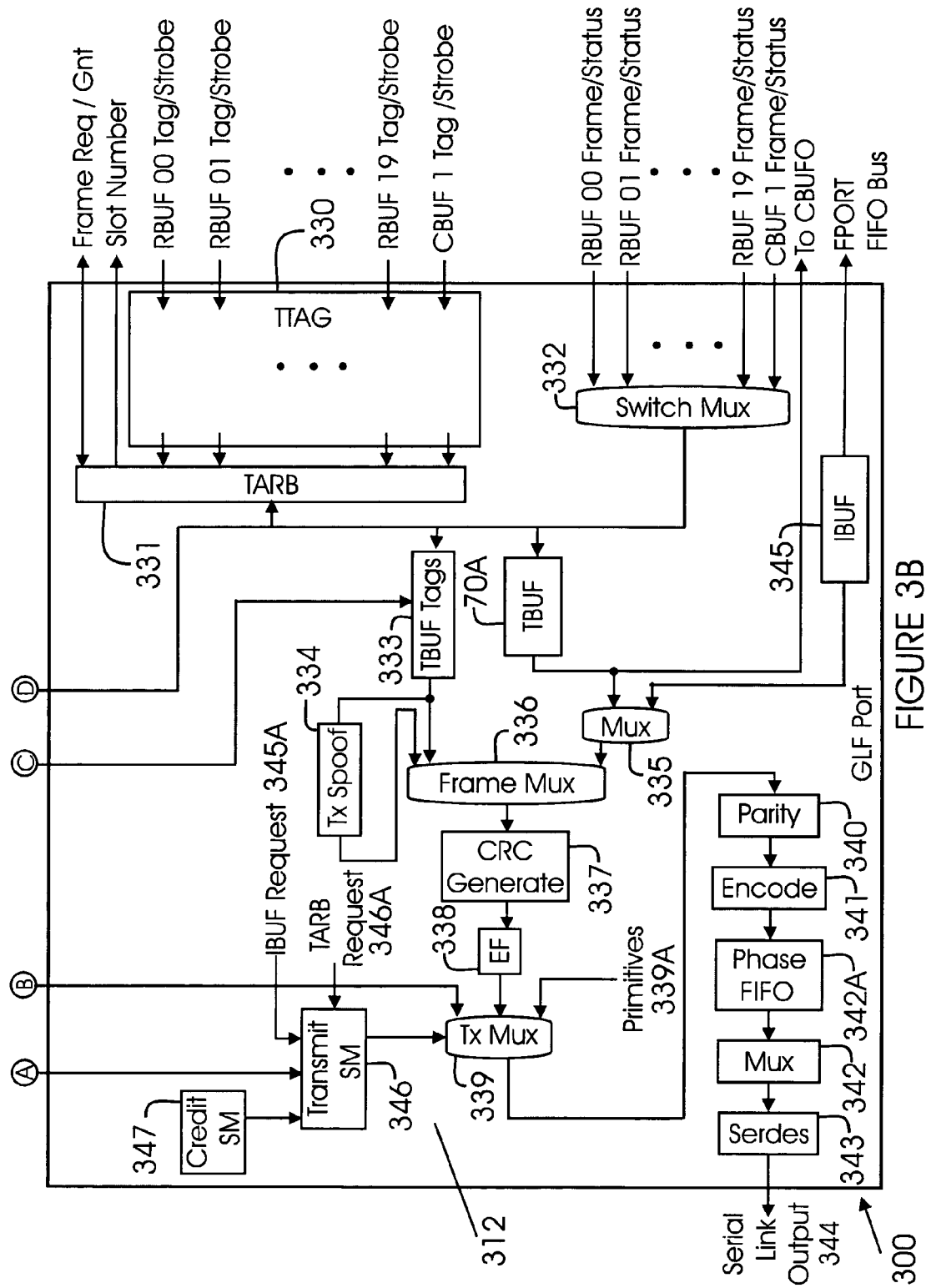

GL_Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL_Port:

Frames enter through link 301 and SERDES 302 converts data into 10-bit parallel data to fibre channel characters, which are then sent to receive pipe ("Rpipe") 303A (may be referred to as Rpipe 1 and Rpipe 2) via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF0), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot numbers to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses. Alias cache 315 based routing is described below in detail, according to one aspect of the present invention.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment 312 of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TxMUX 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
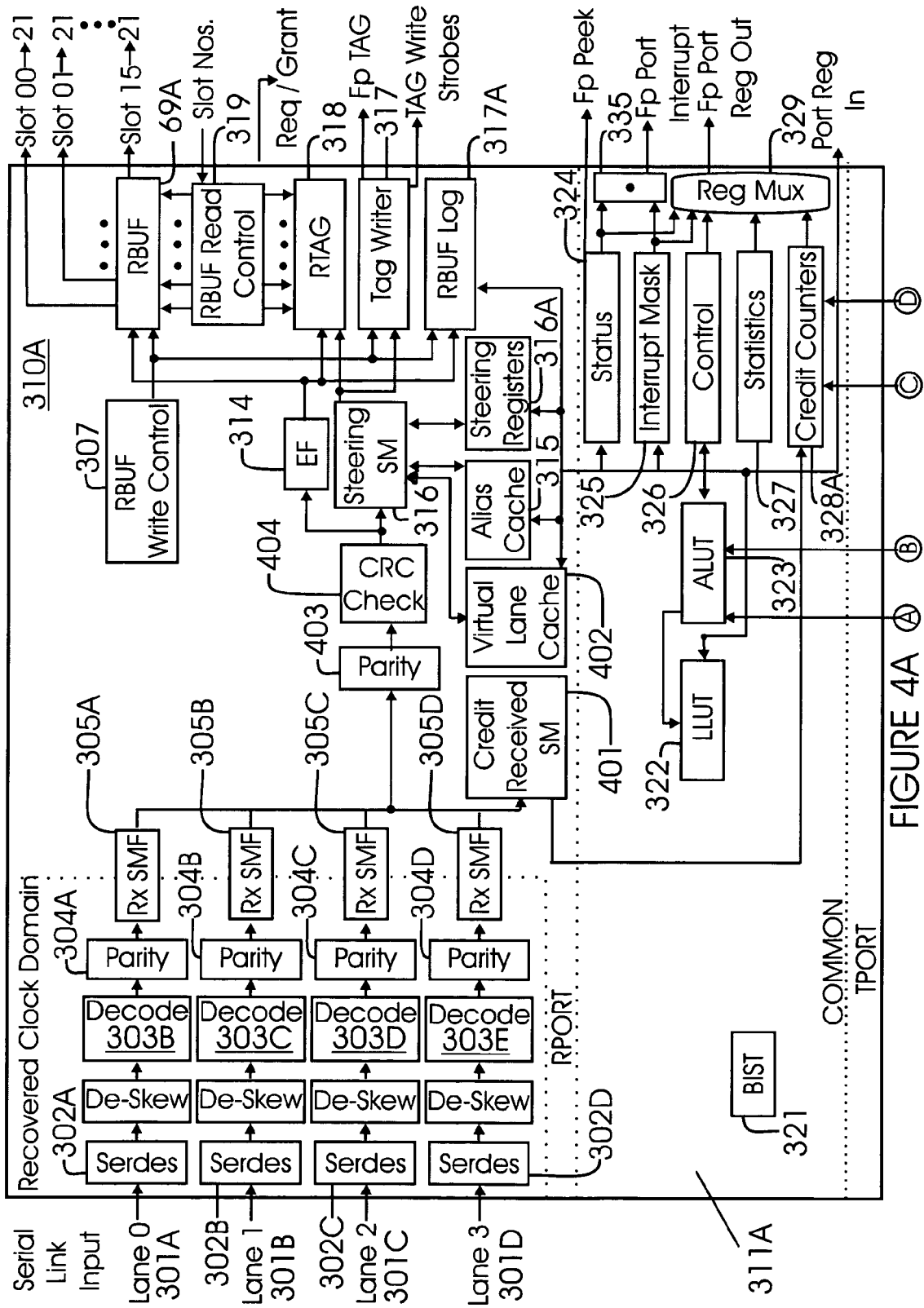
FIGS. 4A/4B (jointly referred to as FIG. 3) show a block diagram of XG_Port (10 G) port, according to one aspect of the present invention.
Figure 4B:
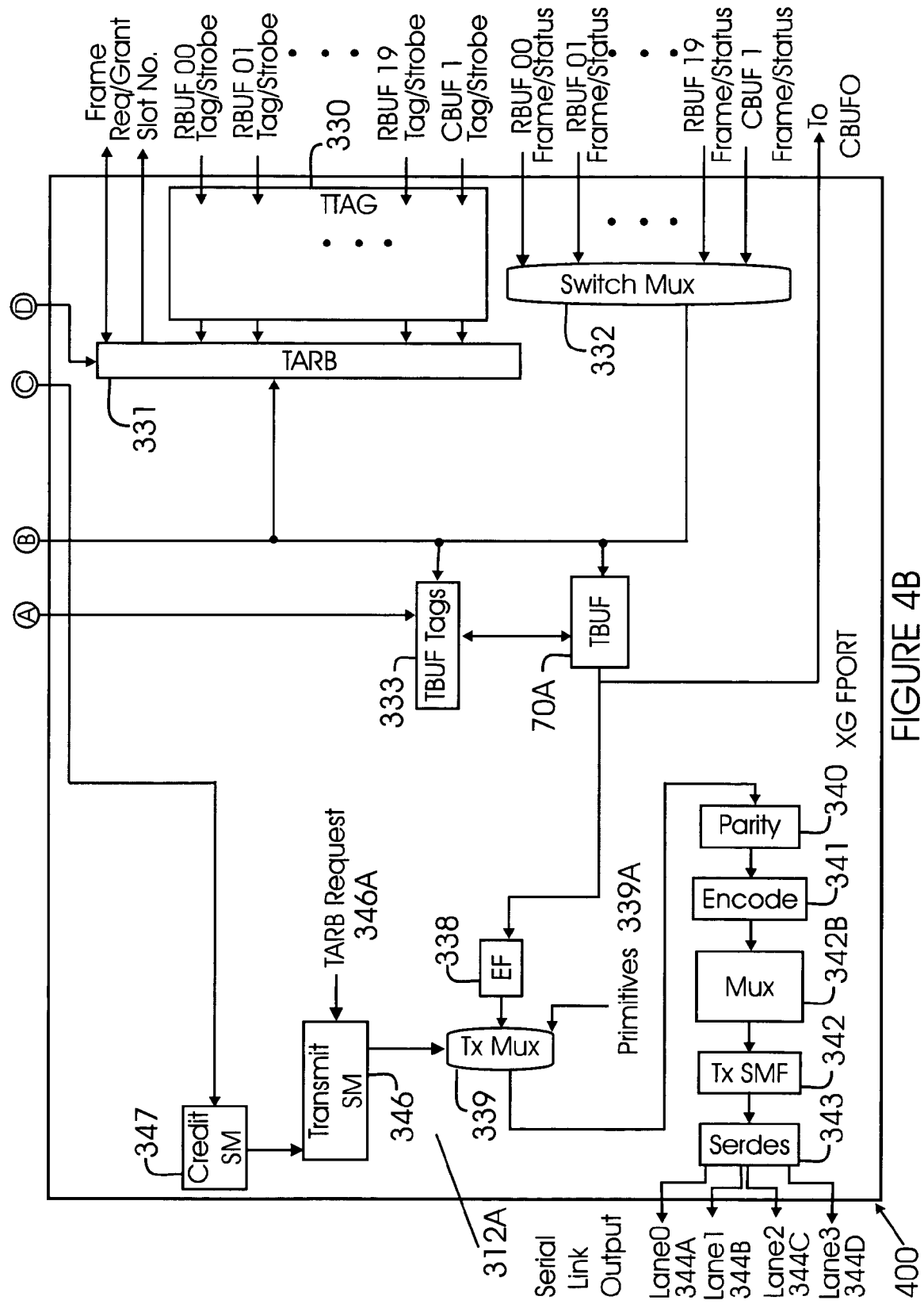

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a transmit (TXSMF) SMF module 342 that handles clock variation on the transmit side. SERDES 343 then sends the data out to the link.

Alias Cache (May Also be Referred to as "AC") 315:

In one aspect of the present invention, AC 315 is used to route/intercept and filter/track or trace frames in ways that are not taught by standard fibre channel physical frame address processing. In one aspect of the present invention, AC 315 assists in routing unicast, multicast and broadcast frames to any port (including IOP 66); uses a conditional match on word depth and frame word (byte or bit comparison); uses a conditional match on prerequisite entry status value; uses a conditional match on class of frames; and uses action codes, as described below.

AC 315 may also be used to route/filter virtual storage area network ("VSAN") tagged frames or other fabric extension frames. It could also be used to route/filter frames without normal fibre channel routing information, i.e. Ethernet VSAN frames.

Figures 1, 1E, 2:
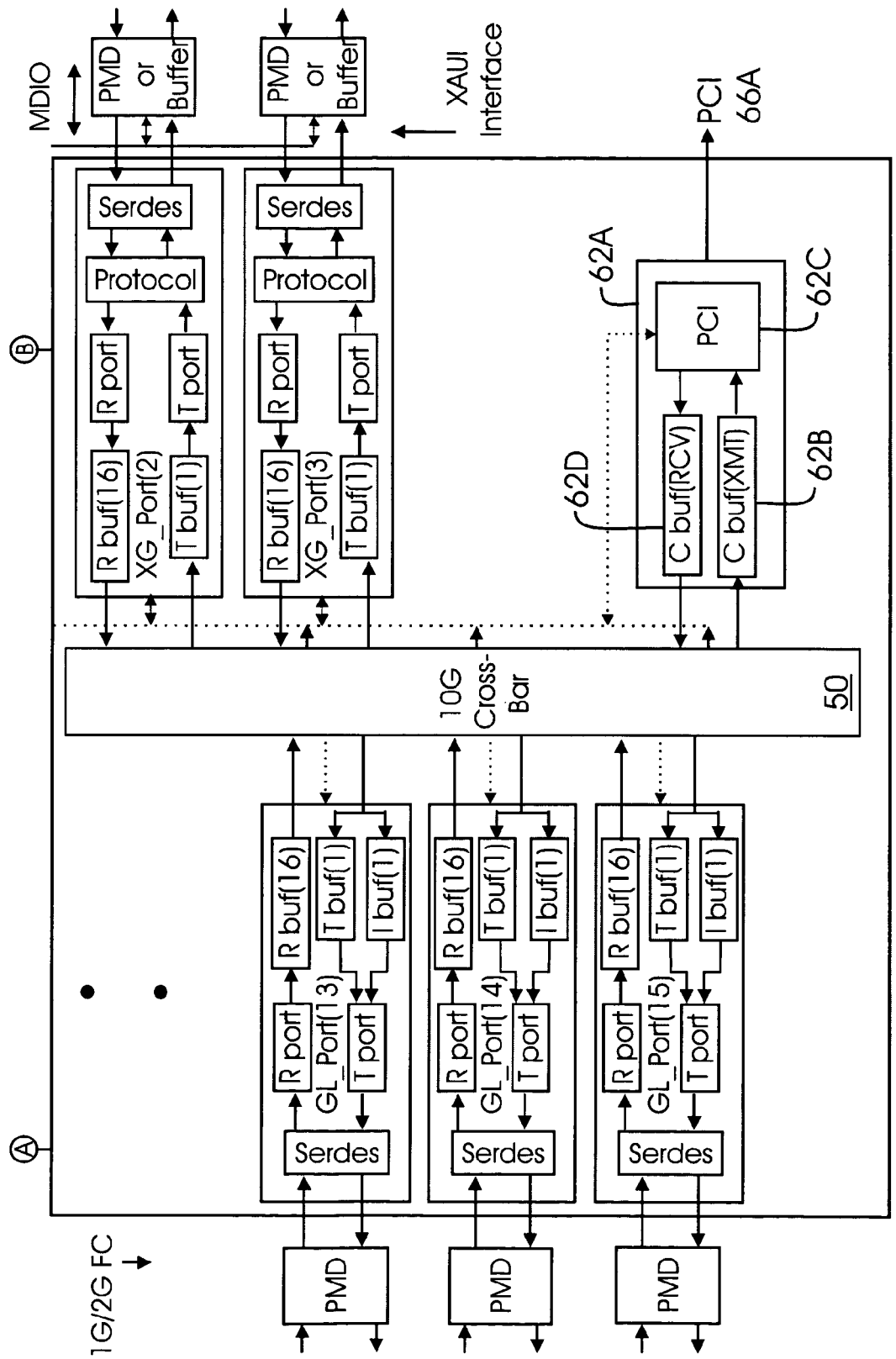
Figures 1, 2:
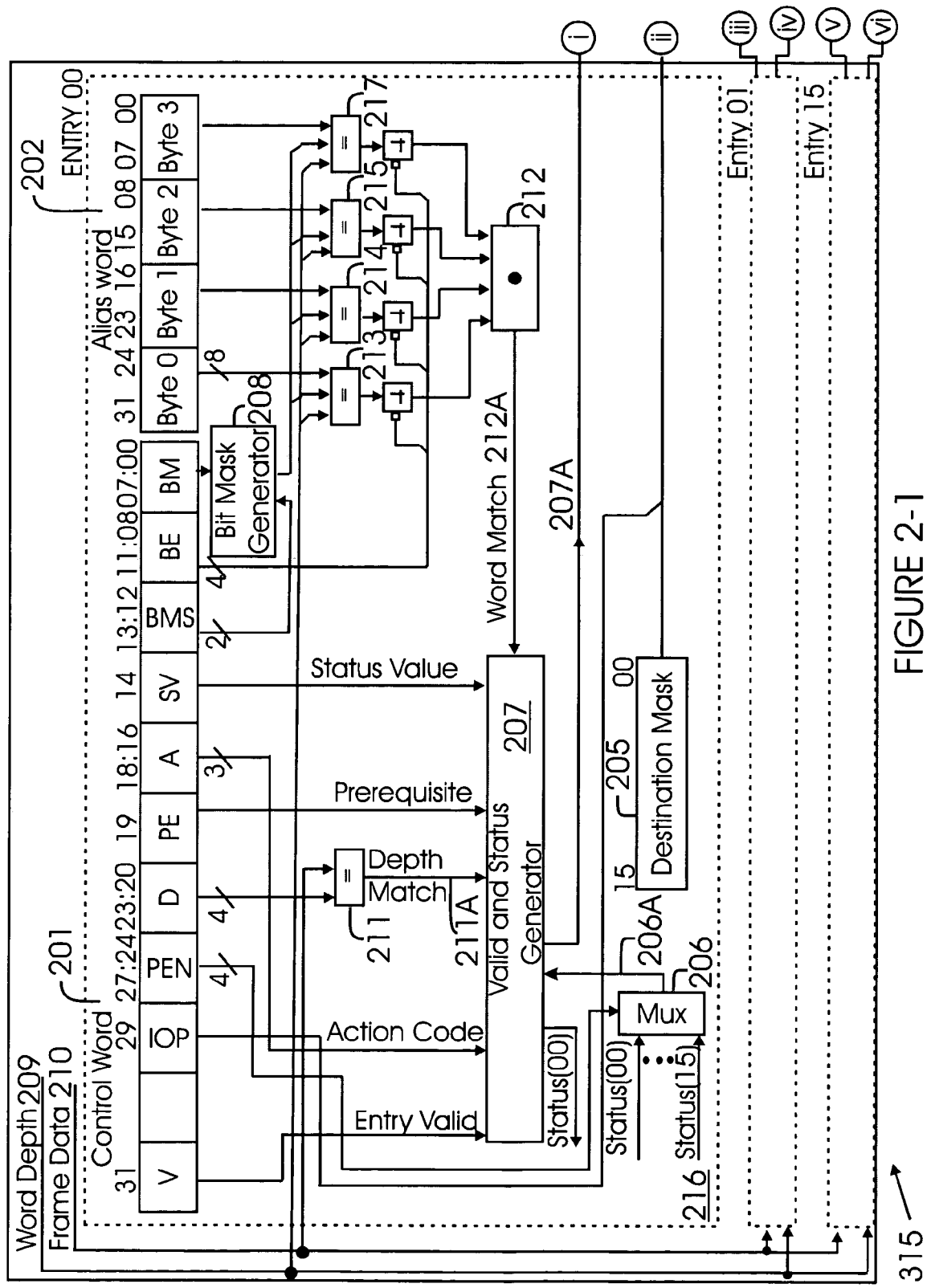
Figure 2:
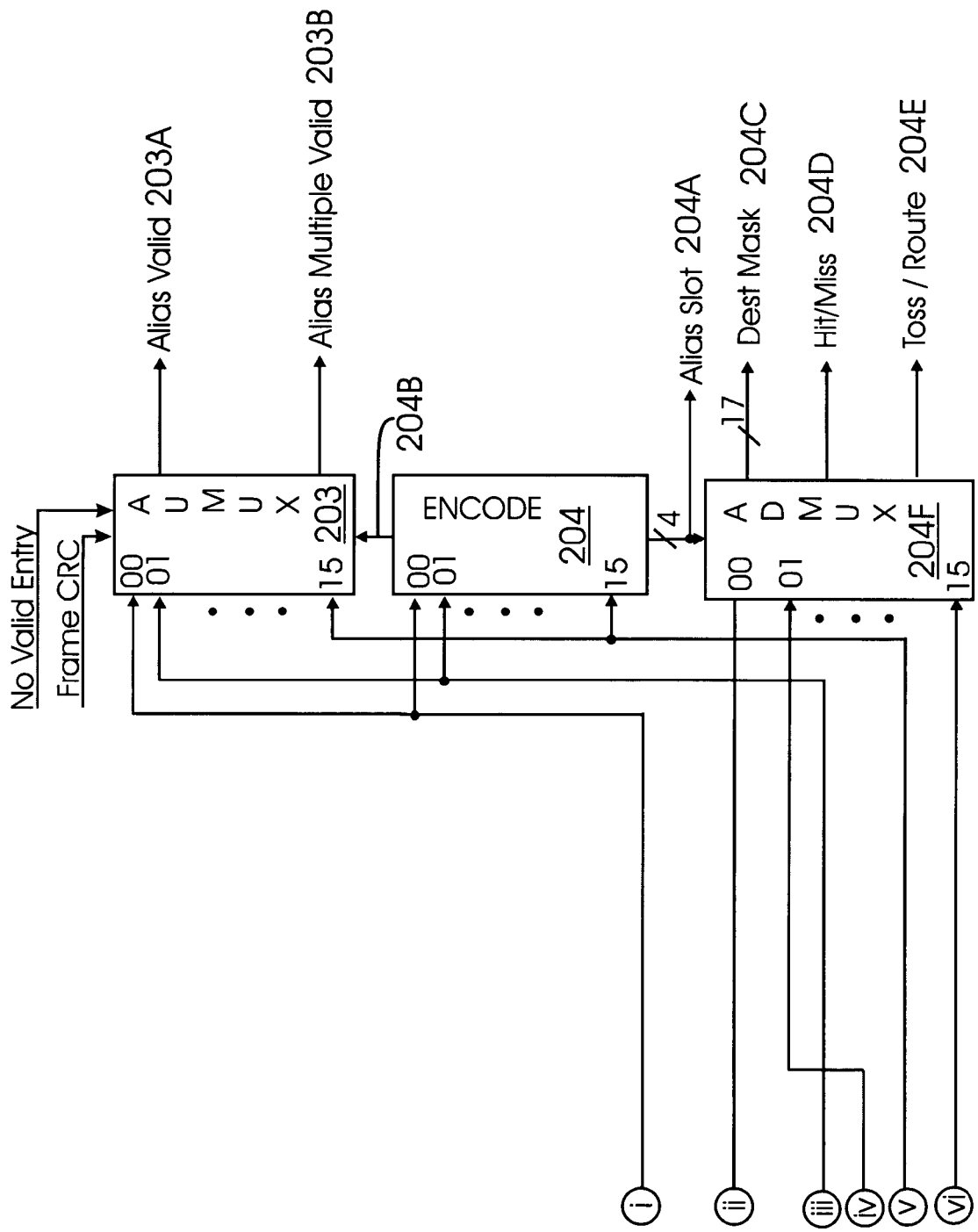

AC 315 includes multiple entries that are compared with incoming frame data. All AC 315 entries are compared at the same time so that frame flow is not affected by the compare process step. A word, multi byte or single byte or bit comparison may be used. Each entry consists of a valid flag, an action code, compare to data and word depth for the comparison. Entries are numbered, for example, as 0 to n, where n is the highest number (for example, as shown in FIG. 2, entry 00 to entry 15 for sixteen entries). The adaptive aspects of the present invention are not limited to any particular entry numbering scheme or number of entries.

As frame words are received, each frame word is compared for entries that match the word depth. An action code and the results of the comparison determine how the frame is routed/filtered, for example:

a. A frame is routed to the destinations specified by a matching AC 315 entry. IOP 66 may be one such destination.

b. The frame is discarded as specified by an AC 315-action code.

c. A status is set for later inspection.

d. The frame is routed using the fibre channel standard physical destination-addressing scheme.

As described below in detail, each AC 315 entry includes the following:

32 bits (4 bytes) of data that is compared with frame data.

Word depth, indicating the word in the frame to compare with.

Compare byte enable flags, which determine the 4 bytes of the frame word that are compared.

Bit masks to determine which bits of the bytes are compared.

"Bit mask select" determines the byte to which the bit mask is applied.

Prerequisite data to determine if results of a different entry (at a lower word depth) are to be used to determine if the entry is a match.

Action code, to determine what action is to be performed depending on the results of the compare.

Destination list to determine what destinations the frame is routed to, if routing is indicated by the action codes. Copies of the frame can be routed to multiple destinations, including IOP 66.

FIG. 2 shows a schematic of AC 315 used for routing/filtering frames, according to one aspect of the present invention. AC 315 receives incoming word depth 209 and frame data word 210. AC 315 includes entries 0 to 15, i.e. 16 entries. The first entry is shown in detail as 216. Entry 216 includes 32 bits alias word entry 202, which is compared with frame data word 210. It is noteworthy that the present invention is not limited to any particular size of alias word 202. Alias word 202 is written by IOP 66 and is used to compare to frame data word 210.

Entry 216 also includes a control word 201 in register 326 that is written by IOP 66. Control word 201 field(s) settings determine the associated entry's mode of operation. The following provides a listing of control word 201 field/bit entries:

"V": This indicates a valid field;
"IOP": This field denotes that a frame is to be sent/copied to IOP 66;
Prerequisite Entry Number ("PEN"): This field denotes which slot PE will be used for determining an entry match on a slot.;
"D": This field is for word depth indicating which word in a frame is compared;
"PE": This field denotes a prerequisite enable status. Prerequisite data determines if results of a different entry (for example, at a lower word depth) are used to determine if an entry is a match;
"A": This field is used for an action code that determines what action should be taken regarding a particular frame, for example, route frame on a match, toss frame on a match or set status on match;
"SV": This field is used to denote active state of the status bit.
"BMS": This field is for "bit mask select" which is sent to a bit mask generator ("BMG") 208 and determines the byte to which the bit mask is applied;
"BE": This field enables bit comparison which determines the bytes of a word that are compared; and
"BM"; This field provides the bit mask to BMG 208 to determine which bits of the bytes are compared.

As shown in FIG. 2, word depth 209 is compared by logic 211 with the control word 201 field "D". Logic 211 generates a depth match signal 211A that is sent to a valid and status generator 207.

BMS 208 receives control word 201 field BM and BMS. BMS 208 filters various bit combinations from frame byte compare modules 213-215 and 217. Alias word 202 entries (for example, byte 0, byte 1, byte 2 and byte 3, as shown in FIG. 2) are compared to frame data 210 by logic 213-215 and 217. BMS 208 provides the bit mask to modules 213-215 and 217. Logic 212 determines if there is a word match between frame data 210 and the AC 315 programmed entry word.

If there is a word match, then a word match signal (212A) is sent to the valid and status generator 207 that also receives various inputs from the control word 201, for example, V, A, PE, and SV and depth match entry 211A from logic 211. Valid and Status generator 207 also receives input 206A from status Mux 206 which is based on control word 201 field PEN. Mux 206 receives 16 status signals one from each of the 16 alias cache entries, and one of the 16 entries is sent to valid and status generator 207.

Output 207A from the valid and status generator 207 is sent to an encoder 204. Based on the asserted valid signals from the alias cache entries, encoder 204 asserts an Alias Cache slot value 204A that represents the entry number of the lowest numbered entry which asserted a valid signal.

Based on the value of 204B (output of encoder 204), Mux 203 outputs an alias-valid signal 203A. If more than one alias-valid signal is asserted, then an alias multiple valid status signal 203B is asserted. The valid signal 203A is used to validate information from the destination mask 205.

Destination mask 205 provides routing port information. In one aspect, an IOP 66 read/written register is used to store this information. Destination mask 205 information is sent to Mux 204F that also receives input from encoder 204 and control word 201 IOP field values. Mux 204F generates Toss/Route 204E and Hit/Miss 204D signals. Signal 204E determines whether a frame is routed or tossed. Signal 204D denotes whether the comparison has resulted in a hit or miss. Signal 204C provides the destination mask (frame routing information). Signals 204C, 204D and 204E are sent to SSM 316.

Action codes determine the action based on the results of the comparison described above. No further checks are done for higher word depths any time an action specifies that a frame be routed using the Alias cache 315 destinations, or discarded. The following provides examples of some of the action codes that can be used with the various adaptive aspects of the present invention. It is noteworthy that the invention is not limited to any particular type or number of action codes:

0—If a match, route the frame using the destinations in the Alias cache 315. If not a match, stop compare on higher word depths and use other steering mechanisms.
1—If a match, discard the frame. If not a match, stop compare at higher word depths and use other steering mechanisms.
2—If not a match, stop compares at higher word depths and use other steering mechanisms. If a match, continue to compare at higher word depths.
3—If a match, route the frame using the destinations in the Alias cache 315. If not a match, continue to do compares at higher word depths.
4—If a match, set the entry status to 1 for use by a compare at a higher word depth, and continue.
5—If not a match, set entry status to 1 for use by compare at a higher word depth, and continue.
6—If match and class 3 frame toss, ignore other class of frames.
7—If a match, then increment a counter or set status.

When alias cache 315 is comparing data at a particular word depth, only compares and action codes in entries that specify the particular word depth have any effect. Prerequisite matching is done for prerequisite entries that are a lower word depth than the entry that checks them. Alias cache 315 processing stops if a frame disposition has been determined, the maximum-programmed word depth is reached or the end of the frame is reached, whichever happens first. If alias cache 315 processing ends without a route or discard action, normal physical address processing is done on the frame D_ID per fibre channel standards.

The following provides an example of 16 alias cache entries 216. The word depth for each Alias Cache entry is also provided below:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
|   | 0 | 2 | 0 | 1 | 3 | 5 | 2 |   |   | 7  | 2  | 3  |    |    | 1  |

The foregoing provides the incoming frame word entry numbers from 0-15. When word 0 is received for a frame, entries 1 and 3 are compared to frame word 0. If the frame disposition is not determined, the comparison continues and then word 1 is compared with entries 4 and 14. If the frame disposition is still not determined and comparison is continued, then word 2 is compared with entries 2, 7, and 10. If the frame disposition is still not determined and comparison is continued, then word 3 is compared with entries 5 and 11. If the frame disposition is still not determined and comparison is continued, then word 5 is compared with entry 6. If the frame disposition is still not determined and comparison is continued, then word 7 is compared with entry 9. If the frame disposition is not still determined by the controlling action codes and comparison is continued after all entries, the normal standard routing logic that uses the D_ID as a physical port number is used to route the frame.

The following provides an illustration of the adaptive aspects of the present invention with typical Fibre Channel frames. As discussed above, alias cache 315 can route broadcast frames to all appropriate destinations; intercept the Fibre Channel Extended Link Service (ELS) LS_RJT frame and route it to IOP 66; and intercept the Fiber Channel Switch Internal Link Service (SW_ILS) SW_RJT frame and route it to IOP 66.

Alias cache entry 0:

| Compare data—0x00ffffff | Fibre Channel broadcast address |
|---|---|
| Word depth—0 | Compare with first word in frame (D_ID) |
| Byte enables—bytes 1, 2, 3 | Compare the 3 bytes of the D_ID |
| Byte bit mask—0xff | |
| Bit mask select—byte 0 | Bit mask not needed |
| Prerequisite match required—0 | No prerequisite needed |
| Prerequisite value—0 | |
| Prerequisite entry—0 | |
| Action code—3 | Route on match, else continue |
| Destination list— | All logged in N-ports on local switch and ports used to route broadcasts between switches |

Alias cache entry 1:

| Compare data—0x20000000 | Extended Link code in R_CTL field |
|---|---|
| Word depth—0 | Word 0 contains R_CTL field |
| Byte enables—byte 0 | R_CTL field in byte 0 of word 0 |
| Byte bit mask—0xf0 | High 4 bits of R_CTL field |
| Bit mask select—byte 0 | |
| Prerequisite match required—0 | No prerequisite needed |
| Prerequisite value—0 | |
| Prerequisite entry—0 | |
| Action code—4 | Set entry status on match and continue |
| Destination list— | None |

Alias cache entry 2:

| Compare data—0x22000000 | Type field Switch Fabric Services |
|---|---|
| Word depth—2 | Word 2 contains Type field |
| Byte enables—byte 0 | Type field in byte 0 of word 2 |
| Byte bit mask—0xff | |
| Bit mask select—byte 1 | Bit mask not needed |
| Prerequisite match required—0 | No prerequisite needed |
| Prerequisite value—0 | |
| Prerequisite entry—0 | |
| Action code—4 | Set entry status on match and continue |
| Destination list— | None |

Alias cache entry 3:

| Compare data—0x01000000 | Extended Link LS_RJT code |
|---|---|
| Word depth—6 | Word 6 first payload word |
| Byte enables—byte 0 | ELS command field in byte 0 of word 6 |
| Byte bit mask—0xff | |
| Bit mask select—byte 1 | Bit mask not needed |

| Prerequisite match required—1 | Prerequisite needed for match |
|---|---|
| Prerequisite value—1 | Prerequisite match status needs to be set |
| Prerequisite entry—1 | Entry 1 is prerequisite |
| Action code—0 | Route on match |
| Destination list— | IOP 66 |

Alias cache entry 4:

| Compare data—0x01000000 | Switch Fabric Services SW_RJT command |
|---|---|
| Word depth—6 | Word 6 first payload word |
| Byte enables—byte 0 | SW_ILS command code in byte 0 of word 6 |
| Byte bit mask—0xff | |
| Bit mask select—byte 1 | Bit mask not needed |
| Prerequisite match required—1 | Prerequisite needed for match |
| Prerequisite value—1 | Prerequisite match status needs to be set |
| Prerequisite entry—2 | Entry 2 is prerequisite |
| Action code—0 | Route on match |
| Destination list— | IOP 66 |

This following provides an example of a 30-bit alias control word 201 format:

| Bits | Function |
|---|---|
| 07:00 | Compare Bit Mask |
| Bit 00 = | Enable compare on data bits 00, 08, 16, or 24 |
| Bit 01 = | Enable compare on data bits 01, 09, 17, or 25 |
| Bit 02 = | Enable compare on data bits 02, 10, 18, or 26 |
| Bit 03 = | Enable compare on data bits 03, 11, 19, or 27 |
| Bit 04 = | Enable compare on data bits 04, 12, 20, or 28 |
| Bit 05 = | Enable compare on data bits 05, 13, 21, or 29 |
| Bit 06 = | Enable compare on data bits 06, 14, 22, or 30 |
| Bit 07 = | Enable compare on data bits 07, 15, 23, or 31 |
| | Where 0 = Compare bit for equal or not equal |
| | 1 = Force compare equal |
| 11:08 | Compare Byte Enable |
| Bit 08 = | Enable compare on data bits 07:00 (Byte 3) |
| Bit 09 = | Enable compare on data bits 15:08 (Byte 2) |
| Bit 10 = | Enable compare on data bits 23:16 (Byte 1) |
| Bit 11 = | Enable compare on data bits 31:24 (Byte 0) |
| | Where 0 = Force compare equal |
| | 1 = Enable compare for equal or not equal |
| 13:12 | Bit Mask Select |
| 00 = | Apply Bit Mask to compare bits 31:24 (Byte 0) |
| 01 = | Apply Bit Mask to compare bits 23:16 (Byte 1) |
| 10 = | Apply Bit Mask to compare bits 15:08 (Byte 2) |
| 11 = | Apply Bit Mask to compare bits 07:00 (Byte 3) |
| 14 | Prerequisite compare status value |
| 18:15 | Action Code |
| 0000 = | Route frame on match |
| 0001 = | Toss frame on match |
| 0010 = | Stop compares on miss but continue on match |
| 0011 = | Continue compares on miss but route on a match |
| 0100 = | Set entry status on match and continue |
| 0101 = | Set entry status on miss and continue |
| 0110 = | Increment counter on hit and continue |
| 0111 = | Increment counter on miss and continue |
| 1000 = | Set FPORT Common status register bit on hit and continue |
| 1001 = | Set FPORT Common status register bit on hit and continue |
| 19 | Prerequisite match required for an entry match |
| | Where 0 = Force prerequisite compare equal |
| | 1 = Enable prerequisite compare for equal or not equal |
| 23:20 | Word Match Depth |
| 0000 = | Compare Alias Data against frame data word 0 (R_CTL & D_ID for non-extended fabric frames) |

-continued

| Bits | Function |
|---|---|
| 0001 = | Compare Alias Data against frame data word 1 (CS_CTL & S_ID for non-extended fabric frames) |
| . | . |
| . | . |
| . | . |
| 1111 = | Compare Alias Data against frame data word 15 |
| 27:24 | Prerequisite Alias cache entry number |
| 28 | Reserved |
| 29 | Destination = IOP |
|  | 0 = no |
|  | 1 = yes |
| 30 | Reserved |
| 31 | Valid |
|  | 0 = Not valid |
|  | 1 = Valid |

Addressing is as follows.

| Address | Function |
|---|---|
| Base | Entry 0 |
| Base + 4 | Entry 1 |
| . | . |
| . | . |
| Base + 3C$_h$ | Entry F$_h$ |

Alias Data 202

This provides the 32-bit alias data for the compare mask.

| Bits | Function |
|---|---|
| 31:0 | Alias Data |

Addressing is as follows.

| Address | Function |
|---|---|
| Base | Entry 0 |
| Base + 4 | Entry 1 |
| . | . |
| . | . |
| Base + 3C$_h$ | Entry F$_h$ |

Alias Mask:

This provides a 16-bit destination mask used to steer the frame if there was a hit in the Alias Address. Each Alias Mask Entry has the following format. IOP 66 destination and OBR bits come from the Alias Control field.

| Bits | Function |
|---|---|
| 0 | Destination = FPORT0 |
|  | 0 = no |
|  | 1 = yes |
| 1 | Destination = FPORT1 |
|  | 0 = no |
|  | 1 = yes |
| . | . |
| . | . |

-continued

| Bits | Function |
|---|---|
| . | . |
| . | . |
| 15 | Destination = FPORT15 |
|  | 0 = no |
|  | 1 = yes |
| 31:16 | Reserved for higher port count switches |

Addressing is as follows.

| Address | Entry # |
|---|---|
| Base | 0 |
| Base + 4 | 1 |
| . | . |
| . | . |
| Base + 3C$_h$ | F$_h$ |

Alias Status

This provides the 16-bit alias status for the prerequisite compare function.

| Bits | Function |
|---|---|
| 15:0 | Alias Status |
| 31:16 | Reserved or used for higher port count switches |

FIG. 5 shows a table of various values that are compared and how the action codes are used.

It is noteworthy that the foregoing examples are to illustrate the various adaptive aspects of the present invention. The examples are not intended to limit the invention to any particular field size/functionality or description.

Figure 6:
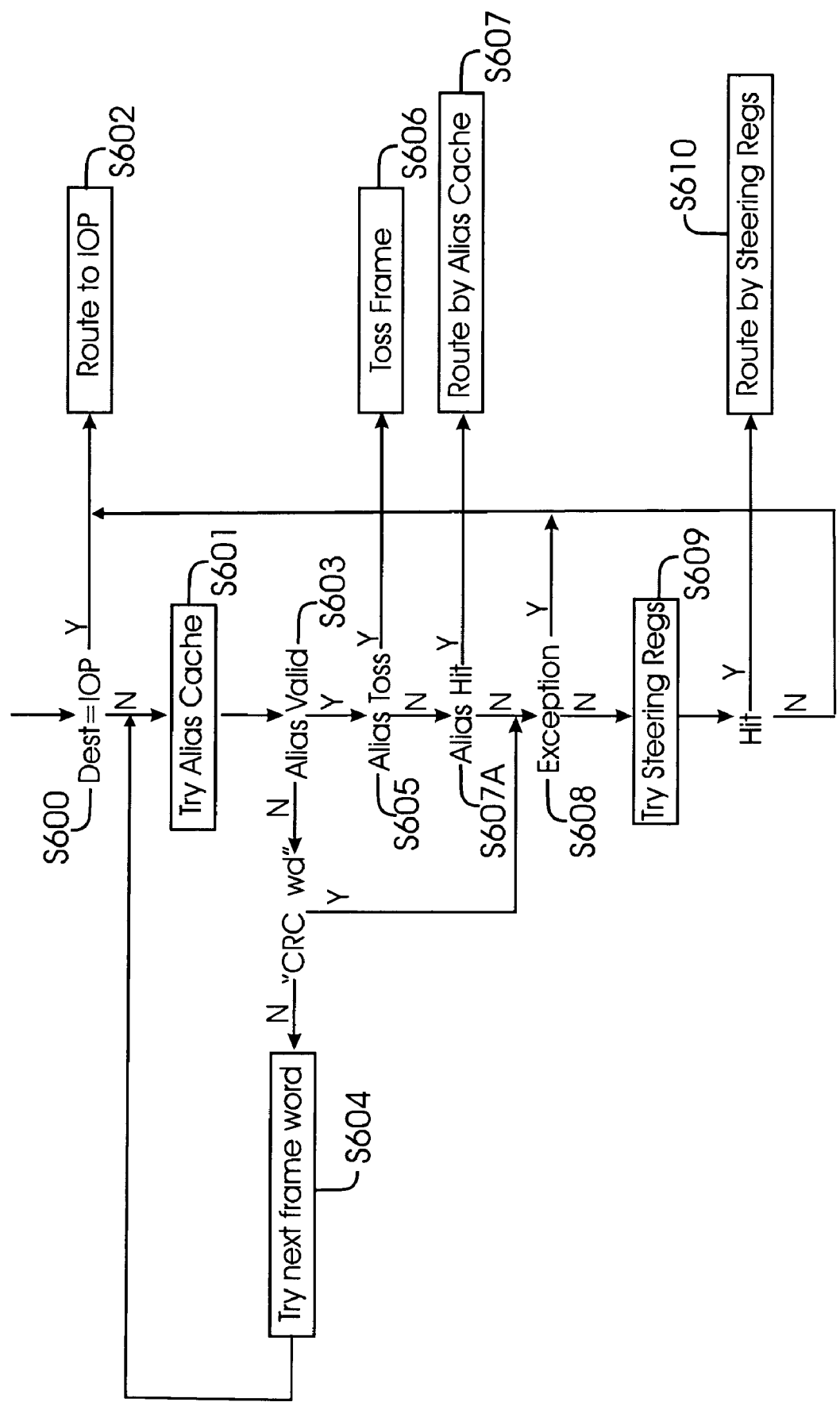
FIG. 6 shows a flow diagram of executable steps for routing frames using alias cache entries, according to one aspect of the present invention.

FIG. 6 shows a flow diagram of using alias cache 315, according to one aspect of the invention. In step S600, the process determines if an incoming frame is destined for IOP 66 based on fixed condition, for example, SOF, without automatic routing fields etc. If yes, then in step S602, the frame is sent to IOP 66.

If the frame is not pre-destined for IOP 66, then in step S601, the process tries Alias Cache 315 routing. In step S603, the process determines, if the Alias cache 315 generates a valid signal. If not, then in step S604, a new frame word is tried.

If the Alias Cache 315 generates a valid signal in step S605, then the process determines, if the frame is to be tossed (signal 204E). If the frame is to be tossed, then it is tossed in step S606.

If the frame does not need to be tossed and there is an Alias Cache 315 hit (203A) in step S607A, then the frame is routed by Alias Cache 315 in step S607. If there is no Alias Cache 315 hit, then in step S608, the process determines if the frame is an exception. If yes, the frame is routed to IOP 66 in step S602. If the frame is not an exception, then steering registers 316A are used in step S609. If there is a valid steering register hit, then the frames are routed by steering register 316A values, in step S610. Otherwise, the frames are routed to IOP 66 in step S602.

In one aspect of the present invention, an efficient routing/filtering/tracking method and system is provided that is flexible and programmable.

Although the present invention has been described with reference to specific embodiments, these embodiments are illustrative only and not limiting. Many other applications and embodiments of the present invention will be apparent in light of this disclosure and the following claims

What is claimed is:

1. A method for processing frames, comprising:

(a) receiving a frame at a port of a switch element;

(b) simultaneously comparing incoming frame information with a plurality of fields of an alias cache entry from among a plurality of alias cache entries that are configured by a switch element processor; wherein the alias cache entry includes a control word based on which the frame is processed by the switch element; and wherein the control word includes a word depth field for identifying which word in the frame is compared to the alias cache entry field, and a programmed action code that determines an action based on the comparison to route the frame to a destination based on a matching alias cache entry, discard the frame, set a status for inspecting the frame and route the frame based on a standard addressing scheme;

(c) performing a word depth match by comparing incoming frame word depth with a programmed word depth of the alias cache entry; and (d) routing the frame based on the action code of the alias cache entry.

2. The method of claim 1, wherein the frame data comparison is performed on a bit by bit or byte-by-byte basis, based on the settings in the alias cache entry.

3. The method of claim 1, wherein a plurality of frame words are compared before any action is taken.

4. The method of claim 1, wherein the alias cache entry includes prerequisite data to determine if a result from a comparison with a different alias cache entry at a different fame word depth is used to determine if the frame information has an entry match.

5. A system, comprising:

a switch element receiving a frame from another device, the switch element comprising:

an alias cache having a plurality of entries for simultaneously comparing frame information with a plurality of fields of an alias cache entry that are configured by a switch element processor;

wherein the alias cache entry includes a control word having a plurality of fields based on which the frame is processed by the switch element; and wherein the control word includes a word depth field identifying which word in the frame is compared to the alias cache entry, and a programmed action code that determines an action based on the comparison to route the frame to a destination based on a matching alias cache entry, discard the frame, set a status for inspecting the frame and route the frame based on a standard addressing scheme;

a frame byte compare block for comparing frame information with an alias cache entry word;

a bit mask generator for filtering bit combinations received from the frame byte compare block; and a depth match block for determining equality between a control word depth field and an incoming frame depth field.

6. The system of claim 5, further comprising:

a valid and status generator module that receives plural inputs from the alias cache entry and the depth match block and generates an output signal that is sent to an encoder module.

7. The system of claim 5, wherein comparison of information in the frame is performed on a bit by bit or byte-by-byte basis, based on the settings in the alias cache entry.

8. The system of claim 5, wherein a plurality of frame words are compared before any action is taken.

9. The system of claim 5, wherein the alias cache entry includes prerequisite data to determine if a result from a comparison with a different alias cache entry at a different fame word depth is used to determine if the frame information has an entry match.

10. A switch element, comprising:

an alias cache having a plurality of entries for simultaneously comparing frame information with a plurality of fields of an alias cache entry that are configured by a switch element processor;

wherein the alias cache entry includes a control word having a plurality of fields based on which the frame is processed by the switch element; and wherein the control word includes a word depth field identifying which word in the frame is compared to the alias cache entry, and a programmed action code that determines an action based on the comparison to route the frame to a destination based on a matching alias cache entry, discard the frame, set a status for inspecting the frame and route the frame based on a standard addressing scheme;

a frame byte compare block for comparing frame information with an alias cache entry word;

a bit mask generator for filtering bit combinations received from the frame byte compare block; and a depth match block for determining equality between a control word depth field and an incoming frame depth field.

11. The switch element of claim 10, further comprising:

a valid and status generator module that receives plural inputs from the alias cache entry and the depth match block and generates an output signal that is sent to an encoder module.

12. The switch element of claim 10, wherein comparison of information in the frame is performed on a bit by bit or byte-by-byte basis.

13. The switch element of claim 10, wherein a plurality of frame words are compared before any action is taken.

14. The switch element of claim 10, wherein the alias cache entry includes prerequisite data to determine if a result from a comparison with a different alias cache entry at a different fame word depth is used to determine if the frame information has an entry match.

15. A method for processing frames, comprising:

(a) receiving a frame at a port of a switch element;

(b) determining if the frame is pre-destined for a switch processor;

(c) if the incoming frame is not pre-destined for the switch processor, simultaneously comparing frame information with a plurality of fields of an alias cache entry from among a plurality of alias cache entries that are configured by a switch element processor; wherein the alias cache entry includes a control word based on which the frame is processed by the switch element; and wherein the control word includes a word depth field for identifying which word in the frame is compared to the alias cache entry field, and a programmed action code that determines an action based on the comparison to route the frame to a destination based on a matching alias cache entry, discard the frame, set a status for inspecting the frame and route the frame based on a standard addressing scheme;

(d) performing a word depth match by comparing the frame's word depth with a programmed word depth in the alias cache entry; and (d) routing the frames based on the action code of the alias cache entry.

16. The method of claim 15, wherein the frame data comparison is performed on a bit by bit or byte-by-byte basis, based on the settings in the alias cache entry.

17. The method of claim 15, wherein a plurality of frame words are compared before any action is taken.

18. The method of claim 15, wherein the alias cache entry includes prerequisite data to determine if a result from a comparison with a different alias cache entry at a different fame word depth is used to determine if the frame information has an entry match.

* * * * *

UNITED STATES PATENT AND TRADEMARK OFFICE
CERTIFICATE OF CORRECTION

PATENT NO. : 7,792,115 B2  Page 1 of 2
APPLICATION NO. : 10/894546
DATED : September 7, 2010
INVENTOR(S) : Frank R. Dropps et al.

It is certified that error appears in the above-identified patent and that said Letters Patent is hereby corrected as shown below:

On the first page, in field (57), in "Abstract", in column 2, line 1, delete "fiber" and insert -- fibre --, therefor.

On the first page, in field (57), in "Abstract", in column 2, line 15, delete "fiber" and insert -- fibre --, therefor.

In column 1, line 26, after "Network"" insert -- ; --.

In column 1, line 31, after "Switches"" insert -- ; --.

In column 1, line 52, after "Lane"" insert -- ; --.

In column 1, line 55, after "Elements"" insert -- ; --.

In column 1, line 58, after "Routing"" insert -- ; --.

In column 1, line 61, after "Switch"" insert -- ; --.

In column 1, line 64, after "Ports"" insert -- ; --.

In column 11, line 13, delete ".;" and insert -- ; --, therefor.

In column 11, line 25, delete "." and insert -- ; --, therefor.

In column 13, line 12, delete "Fiber" and insert -- Fibre --, therefor.

In column 17, line 5, after "claims" insert -- . --.

In column 17, line 36, in claim 4, delete "fame" and insert -- frame --, therefor.

In column 18, line 9, in claim 9, delete "fame" and insert -- frame --, therefor.

Signed and Sealed this

Fourteenth Day of December, 2010

David J. Kappos
*Director of the United States Patent and Trademark Office*

In column 18, line 47, in claim 14, delete "fame" and insert -- frame --, therefor.

In column 20, line 6, in claim 18, delete "fame" and insert -- frame --, therefor.